United States Patent

Zoltaszek

[19]

[11] Patent Number: 5,802,691
[45] Date of Patent: Sep. 8, 1998

[54] ROTARY DRIVEN LINEAR ACTUATOR

[76] Inventor: Zenon Zoltaszek, 57 Rose Street, Liverpool, 2170 New South Wales, Australia

[21] Appl. No.: 523,229

[22] Filed: Sep. 5, 1995

Related U.S. Application Data

[63] Continuation-in-part of Ser. No. 185,982, Jan. 11, 1994, Pat. No. 5,471,729.

[51] Int. Cl.$^6$ ..................................................... B21J 15/26
[52] U.S. Cl. .................................. 29/243.526; 72/391.8; 72/114; 222/390; 227/129
[58] Field of Search ........................ 29/243.526; 72/114, 72/391.8; 222/390; 227/129

[56] References Cited

U.S. PATENT DOCUMENTS

| | | | |
|---|---|---|---|
| 1,920,362 | 5/1933 | Dean . | |
| 2,216,767 | 10/1940 | Davitow . | |
| 2,723,777 | 11/1955 | Amtsberg | 72/114 |
| 3,003,657 | 10/1961 | Siebol et al. . | |
| 3,048,296 | 8/1962 | Heidenwolf . | |
| 3,376,727 | 4/1968 | Hinden . | |
| 3,423,986 | 1/1969 | Young | 29/243.526 |
| 3,596,496 | 8/1971 | Lapointe . | |
| 3,774,437 | 11/1973 | Young | 29/243.526 |
| 3,906,775 | 9/1975 | Benimetzki | 29/243.526 |
| 3,955,395 | 5/1976 | Vecchione . | |
| 4,027,556 | 6/1977 | Klein . | |
| 4,063,443 | 12/1977 | Yarbrough | 29/243.526 |
| 4,085,337 | 4/1978 | Moeller | 29/243.526 |
| 4,205,901 | 6/1980 | Elflein . | |
| 4,368,631 | 1/1983 | Tanikawa . | |
| 5,471,729 | 12/1995 | Zoltaszek | 29/243.526 |
| 5,473,805 | 12/1995 | Wille | 29/243.526 |
| 5,544,401 | 8/1996 | Danino | 29/243.526 |

FOREIGN PATENT DOCUMENTS

| | | |
|---|---|---|
| 35594/68 | 10/1969 | Australia . |
| 67647/74 | 10/1975 | Australia . |
| 70701/74 | 1/1976 | Australia . |
| 76188/76 | 6/1976 | Australia . |
| 5388902 | 8/1984 | Australia . |
| 068869 | 10/1982 | European Pat. Off. . |
| 165110 | 11/1982 | European Pat. Off. . |
| 116954 | 8/1984 | European Pat. Off. . |
| 1007148 | 4/1957 | Germany . |
| 1209850 | 1/1966 | Germany . |
| 211968 | 8/1984 | Germany . |
| 640643 | 12/1978 | U.S.S.R. . |
| WO 86/06662 | 11/1986 | WIPO . |

*Primary Examiner*—David Jones
*Attorney, Agent, or Firm*—Hovey,Williams, Timmons & Collins

[57] ABSTRACT

Actuator apparatus (60) for a device such as a nail or staple gun having a linearly translating tool. The apparatus includes reciprocating means (64) for actuating the tool in a first direction. The apparatus includes a drive shaft comprising a sleeve element (67) rotatably fitted over the reciprocating means and adapted to be driven via rotatable drive means (63, 65). The apparatus includes means (73, 74, 75, 76, 77) for coupling the reciprocating means to the sleeve element such that when the sleeve element is rotated, the reciprocating means moves in a second direction opposite to the first direction. The reciprocating means moves in the second direction against the force of a biasing means (78) for storing potential energy in the biasing means. The apparatus includes means (86, 87, 89, 90) for uncoupling the reciprocating means from the sleeve element when the reciprocating means has moved a preset distance in the second direction. The uncoupling means causes the potential energy stored in the biasing means to be released and converted into kinetic energy in the form of rapid movement of the reciprocating means in the first direction.

22 Claims, 3 Drawing Sheets

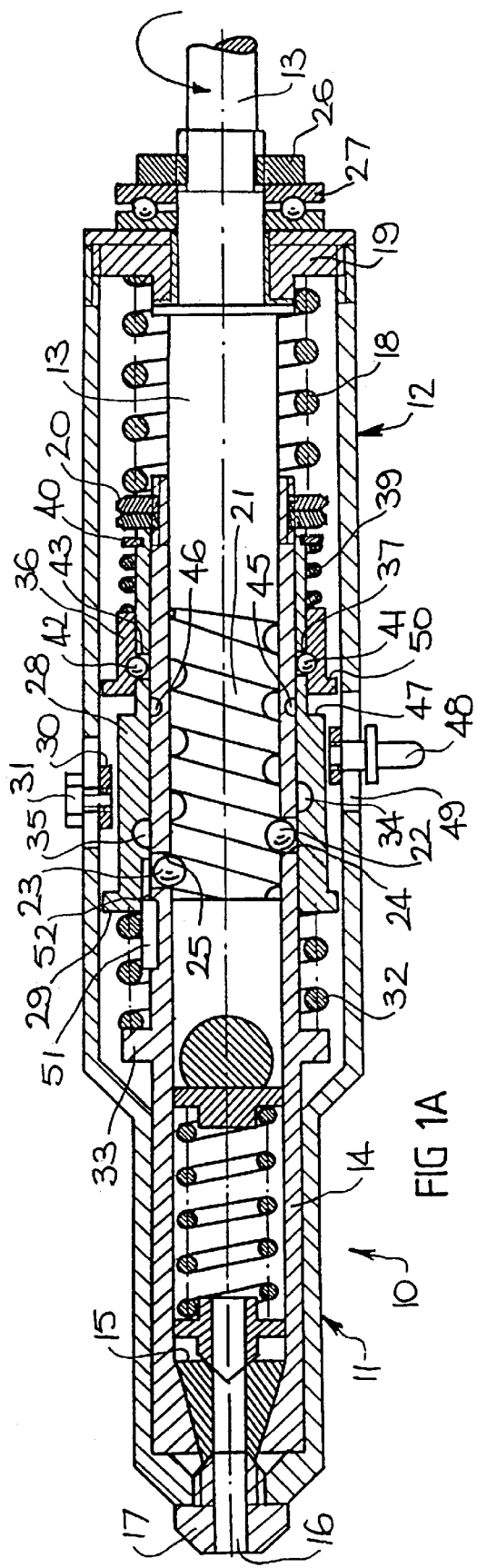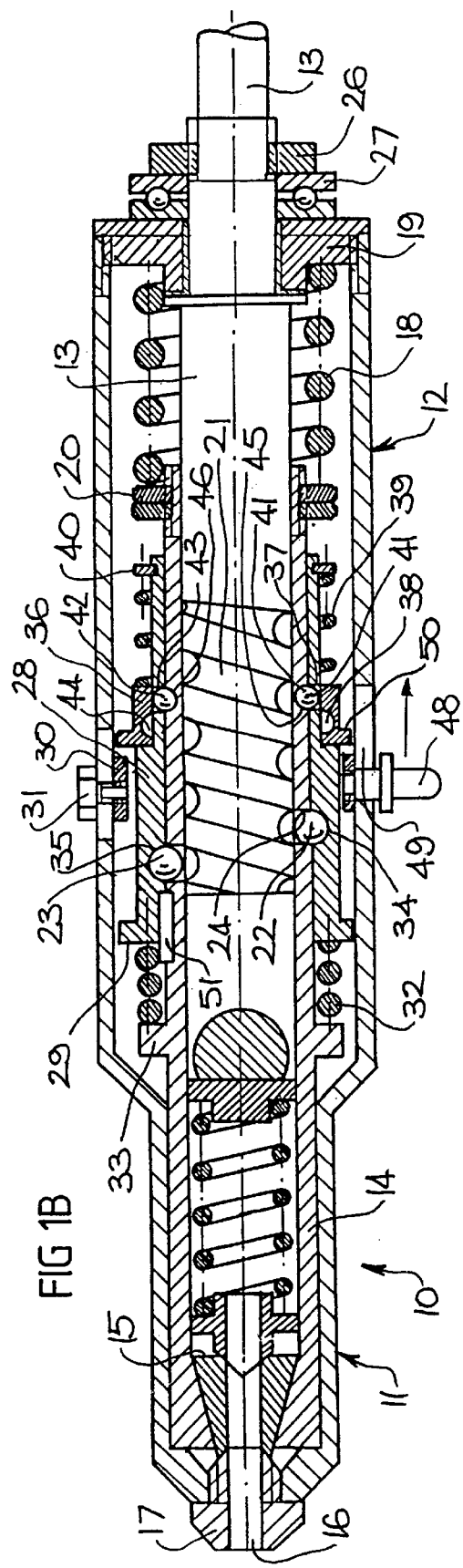

ROTARY DRIVEN LINEAR ACTUATOR

CROSS REFERENCE TO RELATED APPLICATION

This is a continuation-in-part of Ser. No. 185,982, filed 11 Jan. 1994, now U.S. Pat. No. 5,471,729.

BACKGROUND OF THE INVENTION

The present invention relates to a rotary driven linear actuator. In particular the invention relates to a linear actuator which is adapted to be driven via rotatable drive means such as an electric motor, internal combustion engine or the like.

The apparatus of the present invention may be adapted for use in a variety of devices utilizing a linearly translating tool such as a caulking gun, grease gun, nail gun, staple gun, riveting apparatus or the like.

In some embodiments the apparatus may be integrated with the rotatable drive means such as an electric motor which can be mains or battery powered. In one form apparatus according to the present invention may be adapted to be driven via a cordless electric drill or the like.

Preferred embodiments of the present invention will be described herein with reference to a riveting apparatus, nail gun apparatus and caulking gun apparatus. Nevertheless it is to be appreciated that it is not thereby limited to such applications.

Rivets adapted for use with apparatus according to one embodiment of the present invention comprise a rivet sleeve having a flange at one end and a mandrel insertable through the rivet sleeve. The mandrel has a head at one end diametrically larger than the bore of the sleeve. When the mandrel inserted through the sleeve is pulled and snapped off by the rivetting apparatus, with the sleeve inserted through workpieces, the workpieces are joined together by the flange and the other end of the sleeve which is deformed radially outwardly by being pressed by the head.

Manually operated riveting tools are known, for example as described in Australian Patent Specification 538902 by Taiyo Seiko Co. Ltd. However, a disadvantage of manually operated tools is that they require considerable physical effort to operate particularly when used repetitively or when tackling big riveting jobs such as roofing, fencing etc. or when using large gauge rivets which require more effort to fix.

An object of the present invention is to alleviate the disadvantages of the prior art. A further object of the present invention is to provide actuator apparatus for a device having a linearly translating tool which is suitable to be driven via rotatable drive means.

SUMMARY OF THE INVENTION

According to one aspect of the present invention there is provided riveting apparatus for fixing a rivet having a sleeve and a mandrel insertable through the sleeve, said apparatus comprising:

a drive shaft adapted to be driven via rotatable drive means;

reciprocating means for pulling the mandrel;

means for coupling said reciprocating means to said drive shaft such that when said drive shaft is rotated, said reciprocating means moves in a first direction for pulling said mandrel; and means for uncoupling said reciprocating means from said drive shaft upon completion of a riveting stroke, wherein said uncoupling means is adjustable to provide a variable said riveting stroke.

The coupling means may include a helical groove formed on the drive shaft. The reciprocating means may include a sleeve element slidably fitted over the drive shaft. The coupling means may further include at least one projecting element associated with the sleeve element which engages the helical grove such that when the drive shaft is rotated the sleeve element translates linearly along its axis.

The uncoupling means may include means for disengaging the or each projecting element from the helical groove when the sleeve element has translated a distance which is at least equal to the minimum distance or stroke required to complete a riveting operation. This minimum distance is referred to herein as the "riveting stroke".

The or each projecting element may comprise a ball bearing. The coupling means may include one or more apertures in the sleeve element and means for maintaining the or each ball bearing in contact with the or each aperture and with the helical groove.

The uncoupling means may include one or more recesses associated with the maintaining means and operable to move the or each ball bearing out of contact with the helical groove when the sleeve element has translated a distance equal to the riveting stroke.

According to a further aspect of the present invention there is provided actuator apparatus for a device such as a nail or staple gun having a linearly translating tool, said apparatus comprising:

a drive shaft adapted to be driven via rotatable drive means;

reciprocating means for actuating said tool in a first direction;

means for coupling said reciprocating means to said drive shaft such that when said drive shaft is rotated, said reciprocating means moves in a second direction opposite to said first direction against the force of a biasing means for storing potential energy in said biasing means; and means for uncoupling said reciprocating means from said drive shaft when said reciprocating means has translated a preset distance in said second direction, causing said potential energy stored in said biasing means to be released and converted into kinetic energy in the form of movement of said reciprocating means in said first direction.

The drive shaft may include a sleeve element rotatably fitted over the reciprocating means. The coupling means may include a helical groove formed on the reciprocating means. The coupling means may further include at least one projecting element associated with the sleeve element which engages the helical grove such that when the sleeve element is rotated the reciprocating means translates linearly along its axis. The or each projecting element may comprise a ball bearing. The coupling means may include one or more apertures in the sleeve element and means for maintaining the or each ball bearing in contact with the or each aperture and with the helical groove.

The uncoupling means may include means for disengaging the or each projecting element from the helical groove when the reciprocating means has translated the preset distance. The uncoupling means may include one or more recesses associated with the maintaining means and operable to move the or each ball bearing out of contact with the helical groove when the reciprocating means has translated the preset distance.

According to a still further aspect of the present invention there is provided actuator apparatus for a device such as a caulking or grease gun having a linearly translating tool, said apparatus comprising:

a drive shaft adapted to be driven via rotatable drive means;

reciprocating means for actuating said translating tool in a first direction;

means for coupling said reciprocating means to said drive shaft such that when said drive shaft is rotated, said reciprocating means moves in said first direction to actuate said tool; and means for selectively uncoupling said reciprocating means from said drive shaft to stop movement of said reciprocating means in said first direction and prevent actuation of said tool.

The drive shaft may include a sleeve element rotatably fitted over the reciprocating means. The coupling means may include a helical groove formed on the reciprocating means. The coupling means may further include at least one projecting element associated with the sleeve element which engages the helical grove such that when the drive shaft is rotated the reciprocating means translates linearly along its axis. The or each projecting element may comprise a ball bearing. The coupling means may include one or more apertures in the sleeve element and means for maintaining the or each ball bearing in contact with the or each aperture and with the helical groove.

The uncoupling means may include means for selectively disengaging the or each projecting element from the helical groove. The uncoupling means may further include one or more recesses associated with the maintaining means and operable to move the or each ball bearing out of contact with the helical groove.

BRIEF DESCRIPTION OF THE DRAWINGS

Preferred embodiments of the present invention will now be described with reference to the accompanying drawings wherein:

FIGS. 1A and 1B show sectional views of one form of rivetting apparatus according to the present invention;

Referring to FIGS. 1A and 1B the rivetting apparatus shown generally at 10 comprises a main housing which is essentially tubular (eg. cylindrical) and includes a stepped forward portion 11 and a rear portion 12. Forward portion 11 houses a rivet mandrel gripping and pulling mechanism not unlike that described in aforementioned Patent Specification AU-538902, the contents of which are incorporated herein by cross reference. The rear portion 12 houses a rotary driven linear actuator in accordance with the present invention. The latter is essentially adapted to convert rotating movement of a drivable shaft 13 to linear movement of sleeve element 14 within the main housing. It is to be appreciated that during a rivetting operation sleeve element 14 is moved inwards (to the right in FIGS. 1A/1B) to cause chuck element 15 associated with sleeve element 14 to grip and pull the mandrel portion of a rivet, which extends into housing portion 11 via aperture 16 in rivet nosepiece 17, and is returned to the position shown in FIGS. 1A/1B upon completion of the riveting operation.

Figure 2:
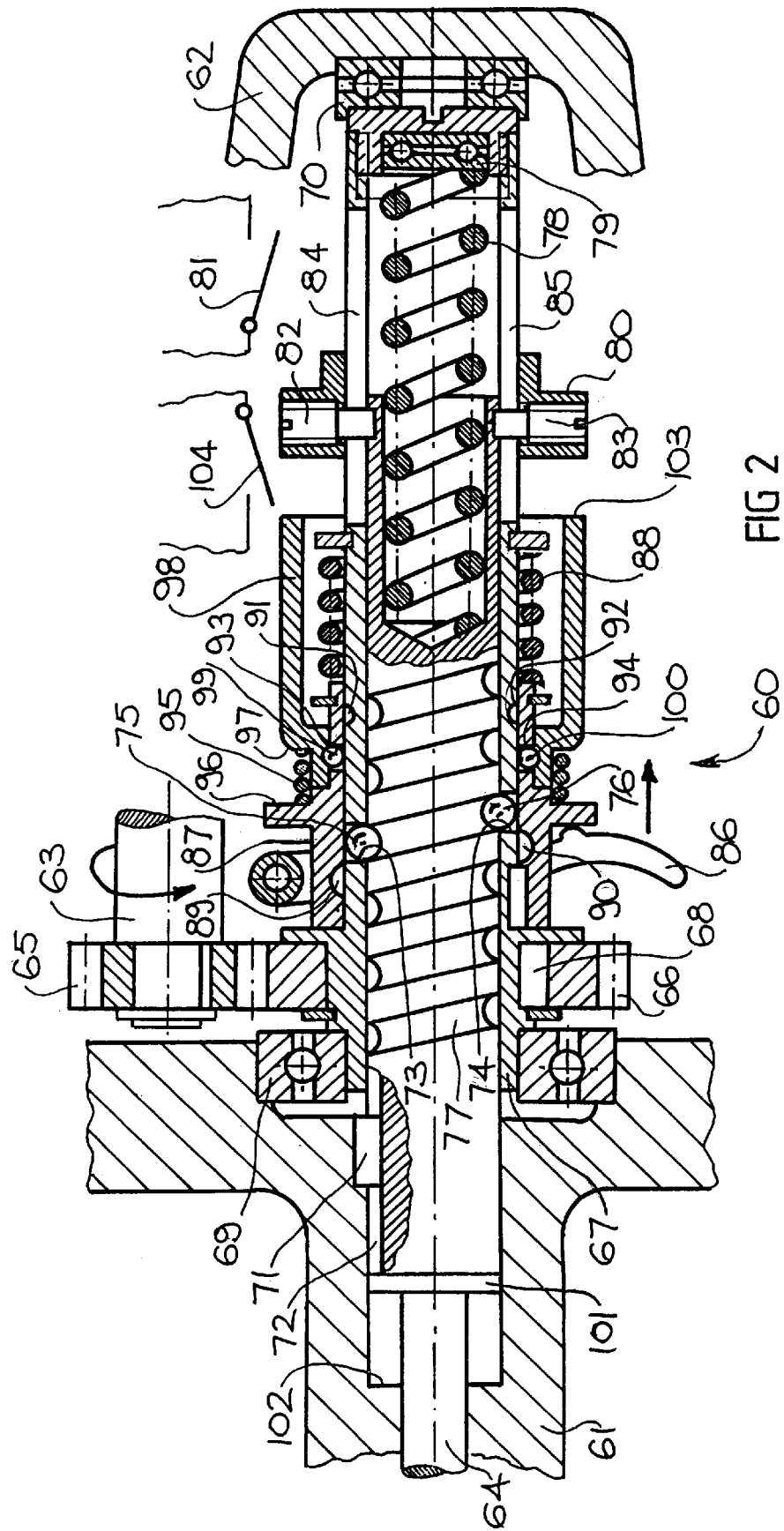
FIG. 2 shows a sectional view of one form of nail gun apparatus according to the present invention.

The abovementioned actuator will now be described with reference to FIGS. 1A–1B. Sleeve element 14 is fitted over drivable shaft 13 so that it can slide to-and-from therealong.

A return spring element 18 is interposed between endpiece 19 and adjustable stop element 20 on sleeve 14. Stop element 20 comprises a pair of nuts threadedly engaging sleeve 14. Spring 18 biases sleeve 14 towards the start position shown in FIG. IA, ie. to the left in FIGS. 1A/1B. Shaft 13 includes a helical groove 21 cut into its outer periphery as shown. Groove 21 receives at least one ball bearing 22 therein such that substantially half of ball bearing 22 extends beyond the periphery of shaft 13. FIGS. 1A/1B show a second ball bearing 23 received in groove 21 but this is optional and may be desirable in heavy duty applications. Ball bearing 22 engages aperture 24 formed in sleeve 14. Ball bearing 23 engages corresponding aperture 25 formed in sleeve 14.

As shaft 13 is rotated in the direction shown by the arrow in FIG. 1A (e.g. via a cordless electric drill or the like) and sleeve 14 is prevented from rotation therewith by any suitable means such as a key and associated keyway (not shown), balls 22, 23 move to the right along helical groove 21 in shaft 13. Because balls 22, 23 are captured in respective apertures 24, 25 formed in sleeve 14, sleeve 14 moves to the right with balls 22, 23 against return spring 18. Because a reaction force is simultaneously applied to shaft 13 in the opposite direction (ie. to the left in FIG. 1A), a nut 26 threadedly engaging shaft 13 supports shaft 13 against endpiece 19 via thrust bearing 27.

Movement of sleeve element 14 (hereinafter be referred to as first sleeve 14) to the right, causes movement of second sleeve 28 which is slidably fitted over first sleeve 14, with it. Second sleeve 28 moves to the right with first sleeve 14 until abutment 29 of second sleeve 28 contacts stop 30 mounted on the main housing. Stop 30 may be adjustable via nut 31 and prevents further movement of second sleeve 28. When second sleeve 28 stops, movement of first sleeve 14 continues causing spring 32, which is contained between abutment 29 of second sleeve 28 and abutment 33 of first sleeve 14, to compress.

Movement of first sleeve 14 (to the right) relative to second sleeve 28 eventually causes aperture 24 in first sleeve 14 to come into registration with recess 34 in second sleeve 28. This causes ball bearing 22 to leave helical groove 21 in shaft 13 and to lodge itself in recess 34. Aperture 25 in first sleeve 14 simultaneously comes into registration with recess 35 in second sleeve 28 causing ball bearing 23 to leave helical groove 21 in shaft 13 and to lodge itself in recess 35.

Movement of ball bearings 22, 23 from helical groove 21 in shaft 13 to respective recessess 34, 35 in second sleeve 28 has two consequences. Firstly, it releases first sleeve 14 from shaft 13 causing return spring 18 to move first sleeve 14 back to its left most position. Secondly, it acts to couple second sleeve 28 to first sleeve 14 as shown in FIG. 1B. Note that spring 32 is now in its compressed position.

It is to be appreciated that the distance between aperture 24 and recess 34 or between aperture 25 and recess 35 in the start position shown in FIG. 1A should be substantially equal to the riveting stroke.

To ensure that sleeves 14, 28 remain coupled against the force of spring 32 as sleeve 14 returns to the start position shown in FIG. 1B, a mechanism for positively locking sleeves 14, 28 together is provided (i.e. after second sleeve 28 has moved along first sleeve 14 by a distance equal to the riveting stroke).

The locking mechanism includes a third sleeve element 36 slidably fitted over second sleeve 28. The locking mechanism also includes aperture 37 in second sleeve 28 and recess 38 in third sleeve 36. Return spring 39 interposed between third sleeve 36 and a circlip 40 fitted in a groove in second sleeve 28 biases third sleeve 36 to the left. In the start position third sleeve 36 is held in the right most position relative to second sleeve 28 shown in FIG. 1A against the force of return spring 39 (in its compressed position) via ball bearing 41.

In the embodiment shown in FIGS. 1A/1B a second ball bearing 42 is shown in corresponding aperture 43 in second sleeve 28 and recess 44 in third sleeve 36, but this is optional.

Operation of the locking mechanism is as follows. When first sleeve 14 moves back with respect to second sleeve 28 during a riveting stroke, recesses 45, 46 provided in the outer periphery of the first sleeve 14, (which recesses 45, 46 are initially, ie. in the start position shown in FIG. 1A, spaced from corresponding apertures 37, 43 by a distance equal to the distance between aperture 24 and recess 34 or between aperture 25 and recess 35 in the start position shown in FIG. 1A) capture ball bearings 41, 42 after sleeve 14 has moved back a distance equal to the riveting stroke as shown in FIG. 1B.

Movement of ball bearings 41, 42 into recesses 45, 46 releases third sleeve 36 whereupon spring 39 moves sleeve 36 to the left until it abuts step 47 in second sleeve 28. In the abutted position (shown in FIG. 1B) third sleeve 36 closes apertures 37, 43 in second sleeve 28 blocking ball bearing 41, 42 in recesses 45, 46 in first sleeve 14 so that they cannot escape thereby positively locking together first and second sleeves 14, 28.

After completing a riveting operation the riveting apparatus is in the position shown in FIG. 1B. To return the apparatus to the start position shown in FIG. 1A a mechanism for releasing second sleeve 28 from first sleeve 14 is provided.

The release mechanism comprises release element 48 slidably mounted in slot 49 formed in the main housing of the apparatus. When it is desired to return second sleeve 28 to the start position shown in FIG. 1A, release element 48 is manually pushed to the right as shown by the arrow in FIG. 1B until it contacts abutment 50 on third sleeve 36. Continued movement of release element 48 to the right causes sliding movement of third sleeve 36 along second sleeve 28 to the right against the force of spring 39. Spring 39 compresses until recesses 38, 44 in third sleeve 36 register with apertures 37, 43 in second sleeve 28, at which time ball bearings 41, 42 are released from recesses 45, 46 in first sleeve 14. This unlocks second sleeve 28 from first sleeve 14 allowing second sleeve 28 to move to the right under the influence of spring 32 ie. back to the position shown in FIG. 1A. Ball bearings 41, 42 are returned to respective recesses 38, 44 in third sleeve 36 preventing further movement of third sleeve 36 and retaining spring 39 in the compressed position shown in FIG. 1A. After returning the apparatus to the start position shown in FIG. 1A the rivetting operation may be repeated by rotating shaft 13. To prevent rotation between sleeves 14, 28 a projecting key 51 is provided on sleeve 14 and a corresponding keyway 52 is provided in sleeve 28.

Referring to FIG. 2, the nail gun apparatus shown generally at 60 comprises a housing including a forward portion 61 and a rear portion 62. Forward portion 61 incorporates a nail holding and driving mechanism (not shown). The apparatus includes a rotary driven linear actuator in accordance with the present invention. The latter is adapted to convert rotary movement of a drivable shaft 63 to linear movement of piston rod 64 within the main housing. During a nailing operation piston rod 64 is caused to move rapidly to the left facilitating the nail driving mechanism to drive a nail into a work surface with a force determined by potential energy stored in the apparatus. The nail holding and driving mechanism may be constructed and arranged in any suitable manner and by any suitable means known to those skilled in the relevant art and will not be described further herein.

The linear actuator will now be described with reference to FIG. 2. The operating cycle commences with an electric motor (not shown) driving shaft 63 in the direction of the arrow. Shaft 63 has gear wheel 65 mounted thereon. Gear wheel 65 meshes with gear wheel 66 mounted on first sleeve element 67. Rotation between gear wheel 66 and first sleeve element 67 is prevented by means of key 68 received in a keyway formed between gear wheel 66 and first sleeve element 67. First sleeve element 67 is journalled for rotation relative to housing portions 61, 62 and piston rod 64 via outer bearings 69, 70 respectively.

Rotation between piston rod 64 and housing portions 61, 62 is prevented by means of key 71 fitted in a keyway formed between piston rod 64 and housing portion 61. The latter keyway includes a longitudinal channel 72 formed in piston rod 64 to facilitate reciprocating movement of piston rod 64 in the housing. First sleeve element 67 includes apertures 73, 74. Ball bearings 75, 76 are located in apertures 73, 74 and in helical groove 77 formed in piston rod 64.

Rotation of ball bearings 75,76 in unison with first sleeve element 67 and gear wheel 66 gives rise to a reaction force between ball bearings 75, 76 and helical groove 77. The reaction force acting on helical groove 77 causes piston rod 64 to move to the right against spring element 78, compressing spring 78 which abuts bearing 79. As piston rod 64 moves to the right, actuating ring 80 which is mounted on the end of piston rod 64 trips switch 81 disconnecting power to the electric motor driving shaft 63 and stopping movement of piston rod 64 and compression of spring 78.

Actuating ring 80 is mounted on piston rod 64 via screws 82, 83 passing through longitudinal grooves 84, 85 formed in first sleeve element 67 allowing actuating ring 80 to slide relative to first sleeve element 67. The nail gun apparatus is now "loaded" and can be fired when ready via trigger element 86.

Actuation of trigger element 86 in the direction of the arrow causes movement of second sleeve element 87 to the right against spring element 88, compressing spring 88. Movement of second sleeve element 87 continues until recesses 89, 90 formed in second sleeve 87 come into registration with apertures 73,74 respectively formed in first sleeve element 67. The force exerted by spring 78 against piston rod 64 causes ball bearings 75, 76 to leave helical groove 77 in piston rod 64 and to lodge themselves in recesses 89, 90 of second sleeve 87. Substantially simultaneously, recesses 91, 92 formed in first sleeve element 67 come into registration with apertures 93, 94 respectively formed in second sleeve 87. The force exerted by spring element 95 which is under compression between shoulder 96 of second sleeve 87 and shoulder 97 of third sleeve element 98, causes third sleeve element 98 to move to the right and ball bearings 99, 100 to leave their respective recesses in third sleeve 98 and to lodge themselves in recesses 91, 92 in first sleeve element 67. Third sleeve element 98 operates as a locking mechanism not unlike that described with reference to FIGS. 1A, 1B, positively locking together first and second sleeve elements 67, 87.

In the latter position of the apparatus, piston rod 64 is released from first sleeve element 67 causing potential energy stored in spring 78 to be released. The potential energy is converted into kinetic energy in the form of rapid movement of piston rod 64 to the left until cushion ring 101 mounted on piston rod 64 contacts wall 102 associated with housing portion 61.

As piston rod 64 approaches the end of its rapid movement to the left actuating ring 80 abuts end 103 of third sleeve element 98 causing it to move to the left against spring 95, compressing spring 95. Under the influence of spring 88 ball bearings 99, 100 are caused to leave recesses 91, 92 in first sleeve 67 and to lodge themselves in respective recesses in third sleeve element 98 as shown in FIG. 2. Spring 88 then moves second sleeve element 87 to the left causing ball bearings 75, 76 to leave recesses 89, 90 in second sleeve 87 and to move into contact with helical groove 77 in piston rod 64. With spring 88 biasing second sleeve to the left, ball bearings 75, 76 are prevented from returning to recesses 89, 90 in second sleeve 87.

As actuating ring 80 moves to the left it also trips switch 104 reconnecting power to the electric motor driving shaft 63. The operating cycle can then be repated as described above.

To facilitate control of the force or energy which is imparted to piston rod 64 and hence the nail which is to be driven by the apparatus, the degree of compression of spring 78 may be adjustable. This adjustment may be performed by mounting switch 81 in a manner permitting longitudinal relocation thereof relative to the housing.

Figure 3:
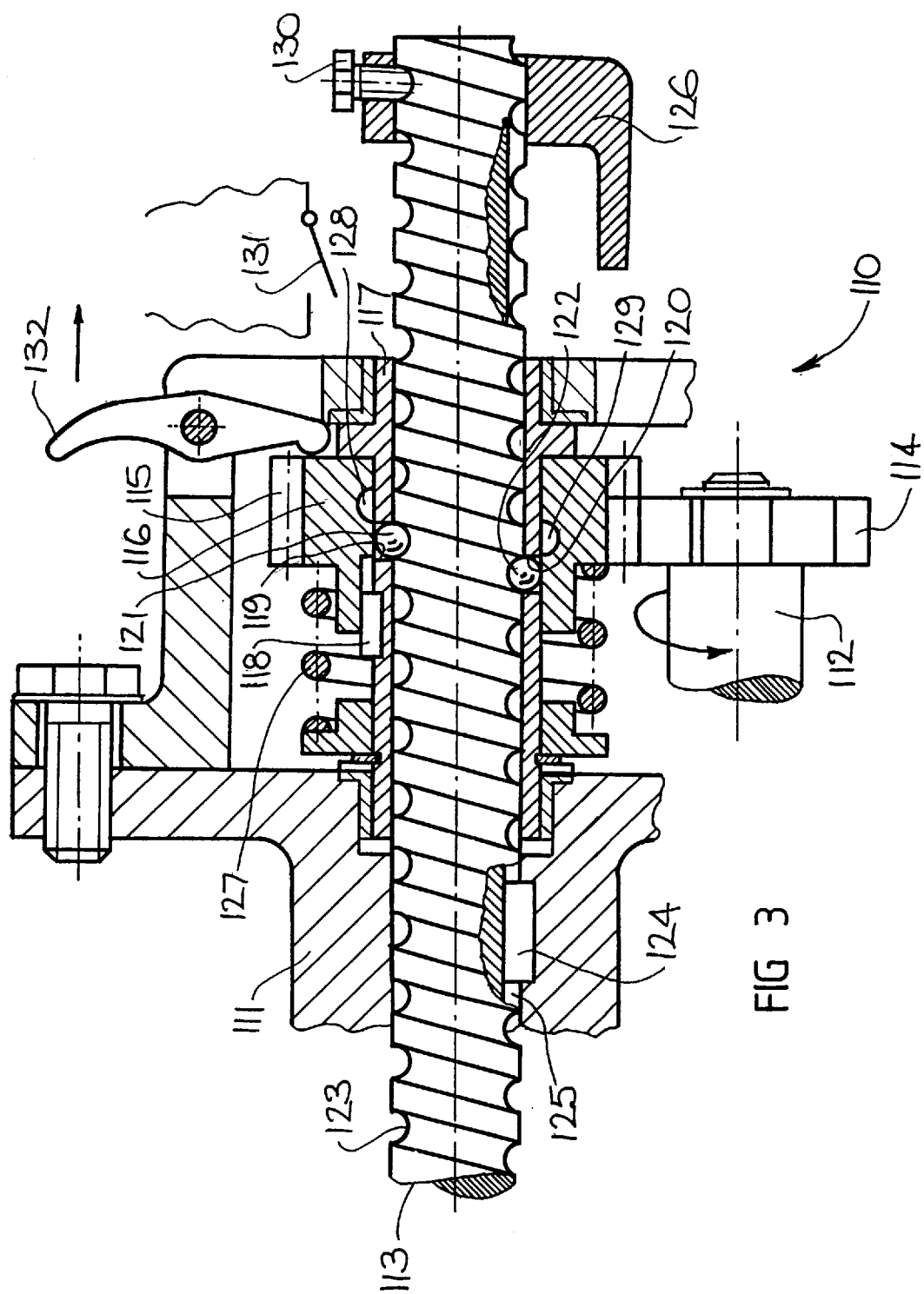
FIG. 3 shows a sectional view of one form of caulking gun apparatus according to the present invention.

Referring to FIG. 3, the caulking gun apparatus shown generally at 110 comprises a housing 111. Housing 111 incorporates a compartment (not shown) for receiving a caulking cartridge. The apparatus includes a rotary driven linear actuator in accordance with the present invention. The latter is adapted to convert rotary movement of a drivable shaft 112 to linear movement of piston rod 113. Piston rod 113 includes a cartridge abutting means (not shown) at the left end thereof for abutting the piston of a caulking cartridge. During a caulking operation piston rod 113 is caused to move slowly to the left facilitating extrusion of a caulking compound (eg. silicon rubber) from the caulking cartridge. The cartridge receiving compartment and abutting means may be constructed and arranged in any suitable manner and by any suitable means known to those skilled in the relevant art and will not be described further herein.

The linear actuator will now be described with reference to FIG. 3. The operating cycle commences with an electric motor (not shown) driving shaft 112 in the direction of the arrow. Shaft 112 has a gear wheel 114 mounted thereon. Gear wheel 114 meshes with gear wheel 115, the latter being integrally formed with second sleeve element 116. Second sleeve element 116 is drivably coupled to first sleeve element 117 via key 118 received in a keyway formed between first and second sleeve elements 117, 116. First sleeve element 117 includes apertures 119, 120 in which are received ball bearings 121, 122 respectively. Ball bearings 121,122 are partly received in helical groove 123 formed in piston rod 113. Rotation between piston rod 113 and housing 111 is prevented via key 124 received in a keyway formed between piston rod 113 and housing 111. The latter keyway includes a longitudinal channel 125 formed along the length of piston rod 113 to facilitate reciprocal linear movement of piston rod 113 relative to housing 111.

Rotation of first sleeve element 117 in unison with second sleeve element 116 and gear wheel 115 causes linear translation of piston rod 113 to the left in FIG. 3. Translation of piston rod 113 to the left continues until arm element 126 mounted at or near the right end of piston rod 113 abuts second sleeve element 116 and moves the latter to the left against biasing spring element 127. As recesses 128, 129 in second sleeve element 116 register with apertures 119, 120 respectively in first sleeve element 117, ball bearings 121, 122 leave helical groove 123 in piston rod 113 and lodge themselves in recesses 128, 129 causing movement of piston rod 113 to stop. The position of arm element 126 along piston rod 113 is adjustable via screw 130 facilitating adjustment of the stroke of piston rod 113 relative to housing 111. Arm 126 is further adapted to trip switch 131 disconnecting supply of power to the electric motor driving shaft 112.

The operating cycle may be repeated by actuating trigger element 132 in the direction of the arrow to cause movement of second sleeve element 116 to the left, ensuring that ball bearings 121, 122 are not in driving contact with helical groove 123 in piston rod 113. When trigger element 132 is in its actuated position, piston rod 113 may be moved manually back to its starting position on the right. As arm element 126 passes switch 131, the latter is tripped reconnecting power to the electric motor driving shaft 112. Trigger element 132 may then be released and the apparatus repeats the operating cycle. Progress of piston rod 113 to the left may be stopped at any time by actuating trigger element 132 in the direction of the arrow. Movement of piston rod 113 will pause as long as trigger element 132 remains actuated.

Finally, it is to be understood that various alterations, modifications and/or additions may be introduced into the constructions and arrangements of parts previously described without departing from the spirit or ambit of the invention.

I claim:

1. Actuator apparatus for a linearly translating tool, said apparatus comprising:

a drive shaft adapted to be driven via drive means which is rotatable in a single direction only;

reciprocating means for actuating said tool;

means for coupling said reciprocating means to said drive shaft such that when said drive shaft is rotated in said direction, said reciprocating means moves linearly to operate said tool; and means for uncoupling said reciprocating means from said drive shaft upon completion of an operating stroke associated with said tool, said uncoupling means including structure for user adjustment in order to selectively vary said operating stroke.

2. Actuator apparatus according to claim 1 wherein said tool is included in a device for fixing a rivet, said rivet having a sleeve and a mandrel insertable through the sleeve and wherein operating of said tool includes pulling said mandrel.

3. Actuator apparatus according to claim 1 wherein said coupling means includes a helical groove formed on said drive shaft and at least one projecting element associated with said reciprocating means which engages said helical groove such that when said drive shaft is rotated, said reciprocating means translates linearly along its axis.

4. Actuator apparatus according to claim 3 wherein said uncoupling means includes means for disengaging the or each projecting element from the helical groove when said reciprocating means has translated a distance equal to said operating stroke.

5. Actuator apparatus according to claim 1 wherein said tool is included in a device such as a nail or staple gun, and wherein said reciprocating means is adapted to move against the force of a biasing means to store potential energy in said biasing means, said means for uncoupling being adapted to cause said potential energy stored in said biasing means to be released and converted into kinetic energy in the form of movement of said reciprocating means.

6. Actuator apparatus according to claim 5 wherein variation of said operating stroke is adapted to vary said potential energy.

7. Actuator apparatus according to claim 5 wherein said drive shaft includes a sleeve element rotatably fitted over said reciprocating means.

8. Actuator apparatus according to claim 7 wherein said coupling means includes a helical groove formed on said reciprocating means and at least one projecting element associated with said sleeve element which engages said helical groove such that when said sleeve element is rotated, said reciprocating means translates linearly along its axis.

9. Actuator apparatus according to claim 8 wherein the or each projecting element comprises a ball bearing.

10. Actuator apparatus according to claim 8 wherein said coupling means includes one or more apertures in said sleeve element and means for maintaining the or each projecting element in contact with a respective aperture and with said helical groove.

11. Actuator apparatus according to claim 10 wherein said uncoupling means includes one or more recesses associated with the maintaining means operable to move the or each projecting element out of contact with the helical groove when said reciprocating means has translated said distance.

12. Actuator apparatus according to claim 8 wherein said uncoupling means includes means for disengaging the or each projecting element from the helical groove when said reciprocating means has translated a distance equal to said operating stroke.

13. Actuator apparatus according to claim 1 wherein said tool is included in a device such as a caulking or grease gun and wherein operation of said tool is influenced by selectively uncoupling said reciprocating means from said drive shaft to stop movement of said reciprocating means.

14. Actuator apparatus according to claim 13 wherein said drive shaft includes a sleeve element rotatably fitted over said reciprocating means.

15. Actuator apparatus according to claim 14 wherein said coupling means includes a helical groove formed on said reciprocating means and at least one projecting element associated with said sleeve element which engages said helical groove such that when said drive shaft is rotated, said reciprocating means translates linearly along its axis.

16. Actuator apparatus according to claim 15 wherein the or each projecting element comprises a ball bearing.

17. Actuator apparatus according to claim 15 wherein said coupling means includes one or more apertures in said sleeve element and means for maintaining the or each projecting element in contact with a respective aperture and with said helical groove.

18. Actuator apparatus according to claim 17 wherein said uncoupling means includes one or more recesses associated with the maintaining means operable to move the or each projecting element out of contact with the helical groove.

19. Actuator apparatus according to claim 15 wherein said uncoupling means includes means for selectively disengaging the or each projecting element from the helical groove.

20. Actuator apparatus for a linearly translating tool, said apparatus comprising:

a drive shaft adapted to be driven via drive means which is rotatable in a single direction only;

reciprocating means for actuating said tool;

means for coupling said reciprocating means to said drive shaft such that when said drive shaft is rotated in said direction said reciprocating means moves linearly to operate said tool; and means for uncoupling said reciprocating means from said drive shaft upon completion of an operating stroke associated with said tool, said uncoupling means including structure for user adjustment in order to selectively vary said operating stroke, said coupling means includes a helical groove formed on said drive shaft and at least one projecting element associated with said reciprocating means which engages said helical groove such that when said drive shaft is rotated said reciprocating means translates linearly along its axis, said at lease one projecting element comprises a ball bearing.

21. Actuator apparatus for a linearly translating tool, said apparatus comprising:

a drive shaft adapted to be driven via drive means which is rotatable in a single direction only;

reciprocating means for actuating said tool;

means for coupling said reciprocating means to said drive shaft such that when said drive shaft is rotated in said direction, said reciprocating means moves linearly to operate said tool; and means for uncoupling said reciprocating means from said drive shaft upon completion of an operating stroke associated with said tool, said uncoupling means including structure for user adjustment in order to selectively vary said operating stroke, said coupling means includes a helical groove formed on said drive shaft and at least one projecting element associated with said reciprocating means which engages said helical groove such that when said drive shaft is rotated, said reciprocating means translates linearly along its axis, said coupling means includes one or more apertures in said reciprocating means and means for maintaining the or each projecting element in contact with a respective aperture and with said helical groove.

22. Actuator apparatus according to claim 21 wherein said uncoupling means includes one or more recesses associated with the maintaining means operable to move the or each projecting element out of contact with the helical groove when said reciprocating means has translated a distance equal to said operating stroke.

* * * * *